Aug. 28, 1945.　　　D. SEITER　　　2,383,688
BORING TOOL
Filed July 26, 1943
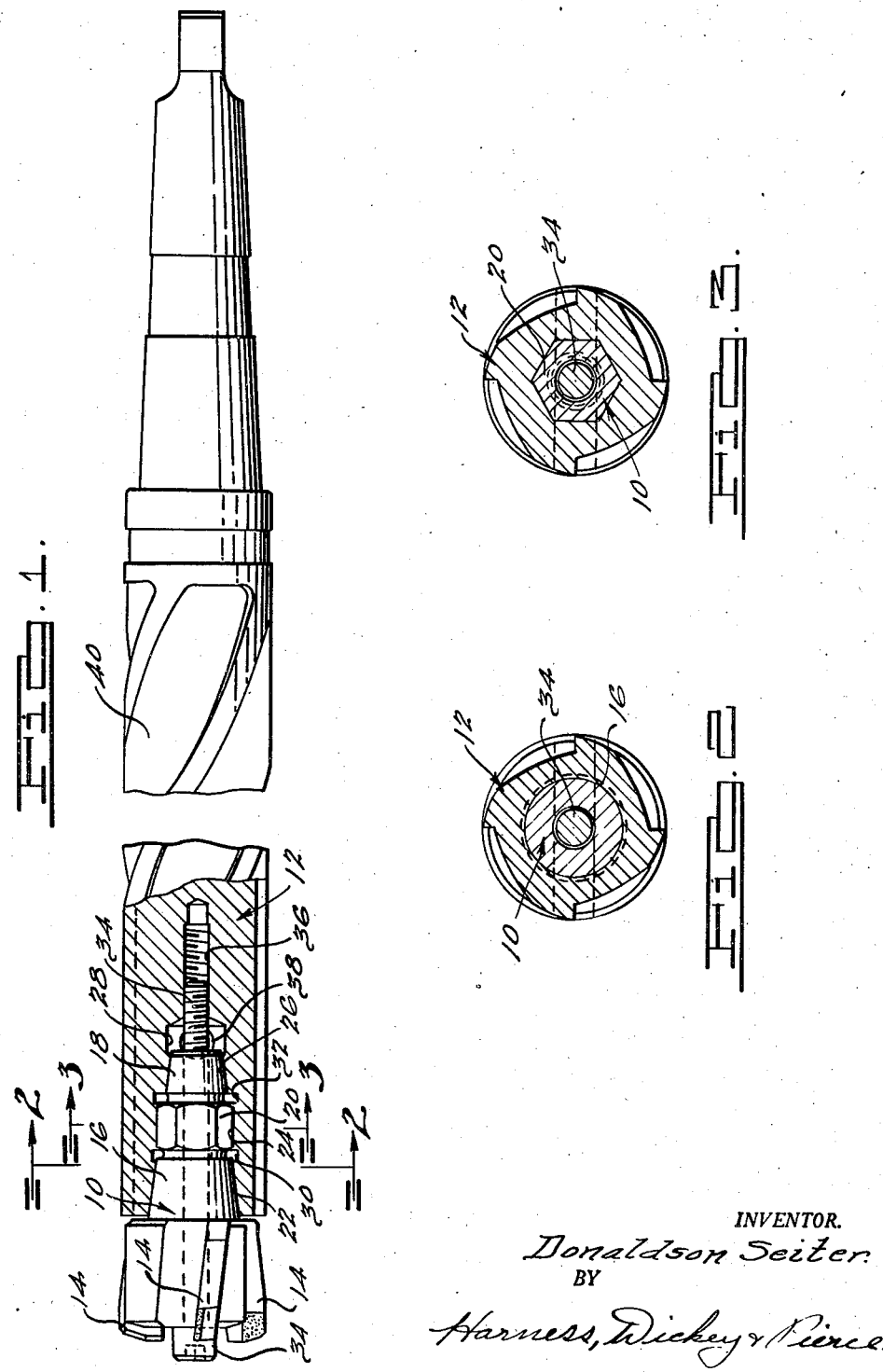
INVENTOR.
Donaldson Seiter.
BY
Harness, Dickey & Pierce.

Patented Aug. 28, 1945

2,383,688

UNITED STATES PATENT OFFICE 2,383,688

BORING TOOL

Donaldson Seiter, Detroit, Mich., assignor to Tungsten Carbide Tool Company, Detroit, Mich.

Application July 26, 1943, Serial No. 496,159

4 Claims. (Cl. 279—8)

The present invention relates to cutting tools and particularly relates to a cutter body and holder assembly.

One of the primary objects of the present invention is to provide improvements in tools of the type mentioned in which an improved drive connection is provided between the cutter body and the holder so that the body is accurately aligned in the holder with a true fit and so that the bearing and driving loads are properly distributed.

A further object of the invention is to provide improvements in the tools of the type which are economical of manufacture.

Other objects of the invention will become apparent from the following specification, from the drawing relating thereto and from the claims hereinafter set forth.

In the drawing in which like numerals are used to designate like parts in the several views throughout:

Figure 1 is a broken, side elevational view with parts in cross section of a tool assembly embodying features of the present invention;

Fig. 2 is a cross-sectional view taken substantially along the line 2—2 of Fig. 1;

Fig. 3 is a cross-sectional view taken substantially along the line 3—3 of Fig. 1.

Referring to the drawing, one illustrative embodiment of the invention is shown which comprises a rotary boring tool including a cutter body generally indicated at 10 which is adapted to be attached to a holder generally indicated at 12.

The cutter body 10 is of the inserted blade type having a plurality of cutter blades 14 removably mounted in slots provided in the cutter body and wedged therein. Those details of the cutter body including the manner in which the cutters are wedged in position therein are described in detail and claimed in the copending application of Donaldson Seiter filed concurrently herewith.

The present invention is concerned primarily with the manner in which the cutter body 10 is mounted on the holder 12. The rear portion of the cutter body is adapted to be received within a complementary, axial recess provided in the holder 12. Such rear portion of the body 10 includes a pair of axially disposed and longitudinally spaced frusto-conical aligning and bearing portions 16 and 18. The frusto-conical portion 16 is disposed adjacent the enlarged head portion of the cutter body 10 and the portion 18 is disposed at the innermost end of the cutter body 10. Such portion of the cutter body has an intermediate and central driving portion 20, which is disposed between the aligning and bearing portions 16 and 18. The driving portion is non-circular and flat sided and in the embodiment illustrated is hexagonal in cross section.

As mentioned above, the holder 12 is formed with an axial recess to receive the rear portion of the cutter body 10. Such recess is generally complementary in shape to the portions 16, 18 and 20 of the cutter body. The recess includes frusto-conical portion 22, a hexagonal portion 24, another frusto-conical portion 26 and terminates in an enlarged recess 28. Annular, run-out recesses 30 and 32 are formed between portions 16 and 20 and 18 and 20, respectively. The taper on portions 16, 18, 22 and 26 are sticking tapers so that when the cutter body is in position in the recess it will be held therein by friction.

A drawbolt 34 passes through an axial opening in the cutter body 10 and the inner threaded end thereof is threadably received within a tapped axial opening 36 provided in the cutter body. The purpose of the drawbolt 34 is obvious and is to fix the body 10 to the holder 12 and hold it against axial displacement. A drift hole 38 is provided through the wall of the holder 12 and communicates with the recess 28 so that a tool may be inserted through the drift hole to knock the cutter body 10 out of the holder. The holder 12 may also be provided with spiral chip flutes 40.

With the above structure, it will be seen that the tapered or frusto-conical bearing and aligning portions 16 and 18 will be received within the corresponding portions 22 and 26, respectively, of the holder so that the cutter body is accurately aligned with a true bearing fit in the holder. By having the bearing portions 16 and 18 located at the front and rear portions of the mounting portion of the body 10, with the drive portion 20 centrally located and disposed between portions 16 and 18, the bearing and driving loads are properly distributed. The portions 16 and 18 take the bearing loads and the intermediate driving portion then only has to take the driving load and is at all times in alignment. For comparison, if the drive were on the end, rather than centrally positioned, the tendency would be to bias the bearing or bias the load on the drive. With applicant's structure, the cutter body and holder are always maintained in alignment with the only requirement in the driving portion that it take the driving load.

Formal changes may be made in the specific embodiments described without departing from the substance of the invention, the scope of which is commensurate with the appended claims.

What is claimed is:

1. A rotary cutting tool comprising a body member having a body portion adapted for driving connection with a driving member, said body portion having a pair of longitudinally spaced and longitudinally tapering aligning and load bearing portions and an intermediate flat sided driving portion.

2. A rotary cutting tool comprising a body member having a body portion adapted for driving connection with a driving member, said body portion having a pair of longitudinally spaced frustoconical aligning and load bearing portions and an intermediate flat sided driving portion.

3. A rotary cutting tool comprising a body member having a body portion adapted for driving connection with a driving member, said body portion having a pair of longitudinally spaced frustoconical aligning and load bearing portions and an intermediate and central flat sided driving portion.

4. A cutter body and body holder assembly comprising a cutter body having a body portion provided with a pair of longitudinally spaced frustoconical aligning and load bearing portions and an intermediate flat sided driving portion, a holder body having an axial recess therein shaped complementary to the shape of said aligning and driving portions and adapted to receive such portions therein, and means to prevent axial displacement of said cutter body with respect to said holder.

DONALDSON SEITER.